Feb. 5, 1963   R. J. BAZARD   3,076,598
DATA PROCESSING SYSTEM
Filed Oct. 30, 1958   7 Sheets-Sheet 1

INVENTOR.
RICHARD J. BAZARD
BY
Christie, Parker e Hale
ATTORNEYS.

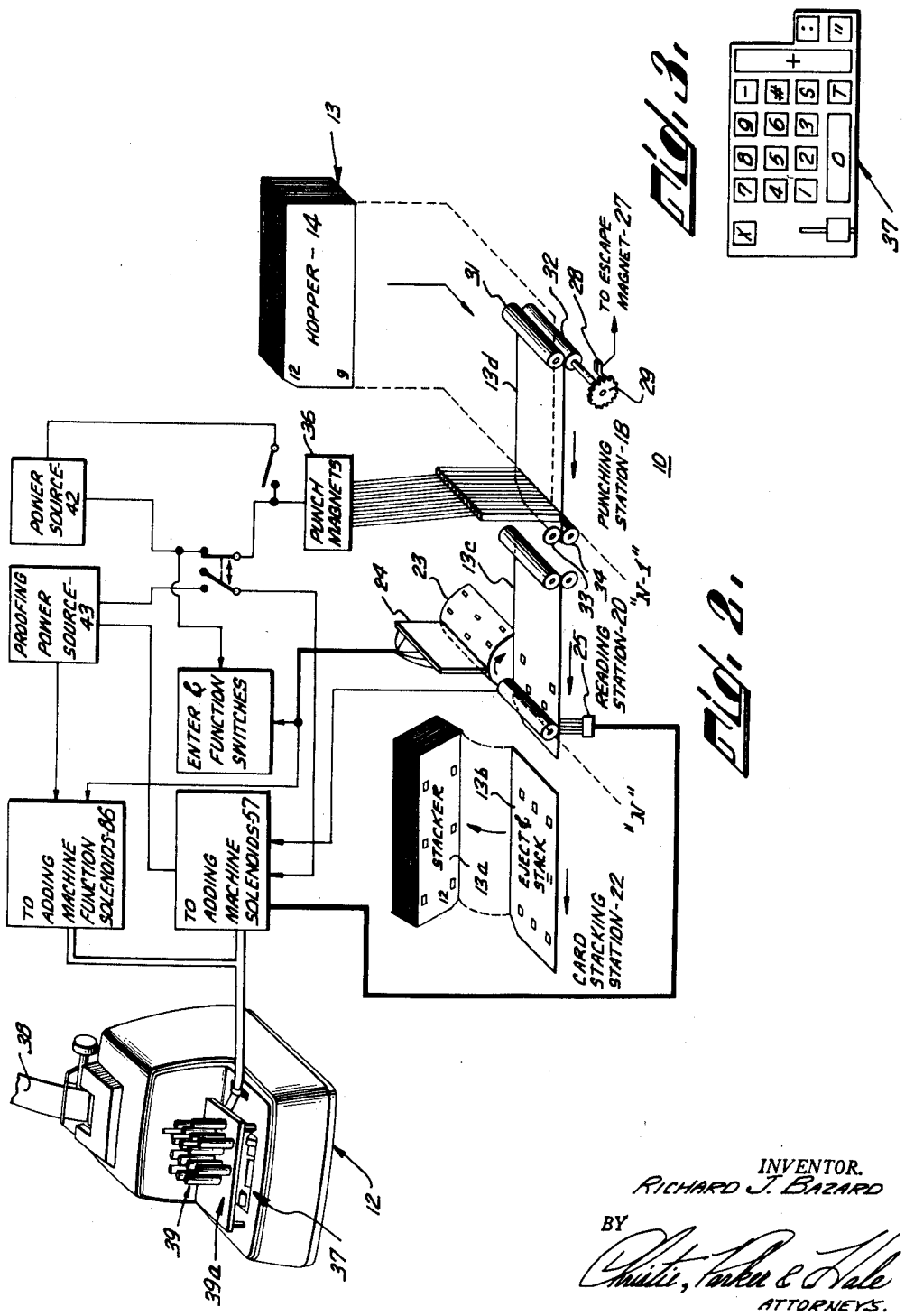

N = CARD COLUMN HAVING ENTER COMMAND;
M = LAST CARD COLUMN OF ENTRY

INVENTOR.
RICHARD J. BAZARD
BY
ATTORNEYS.

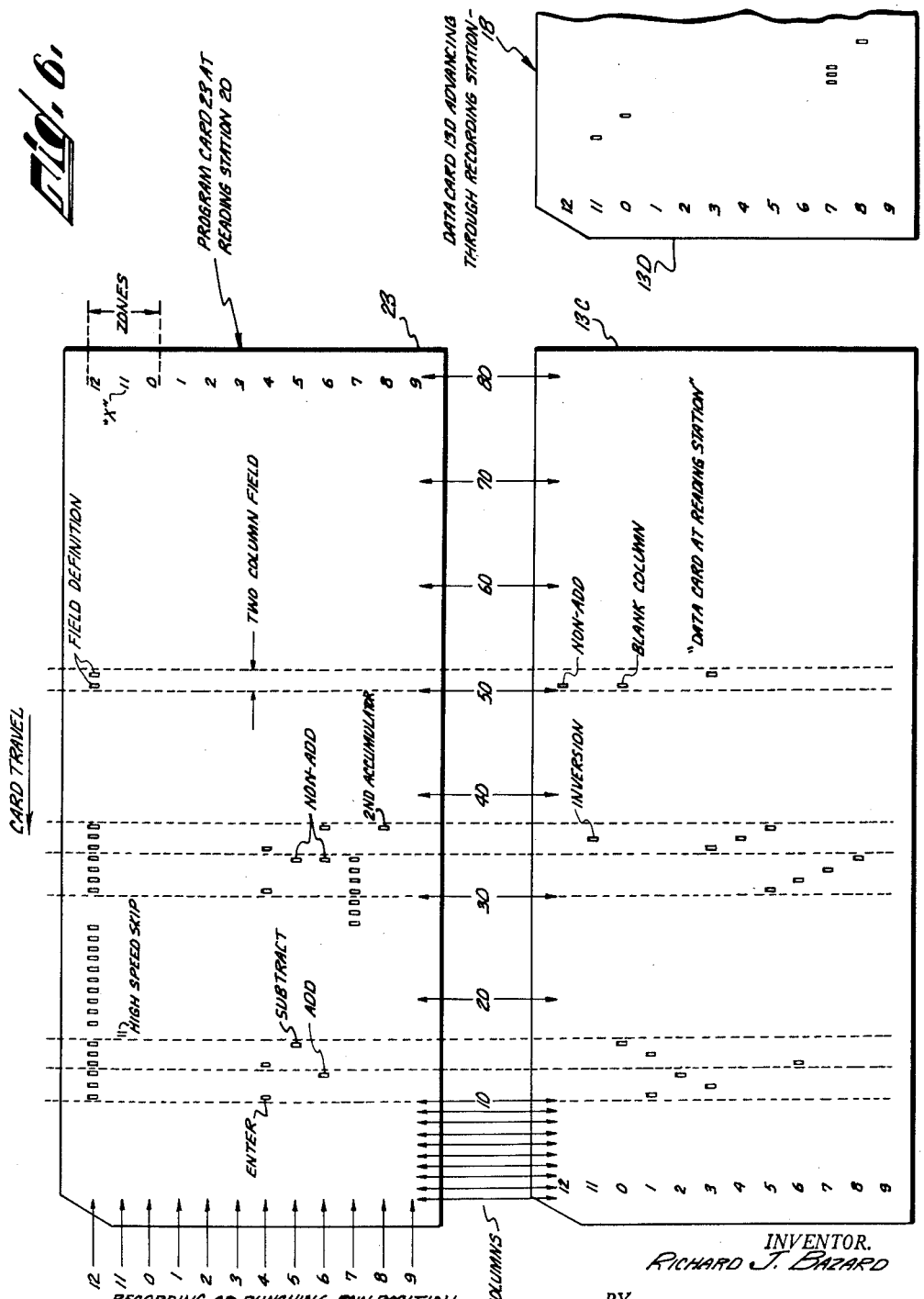

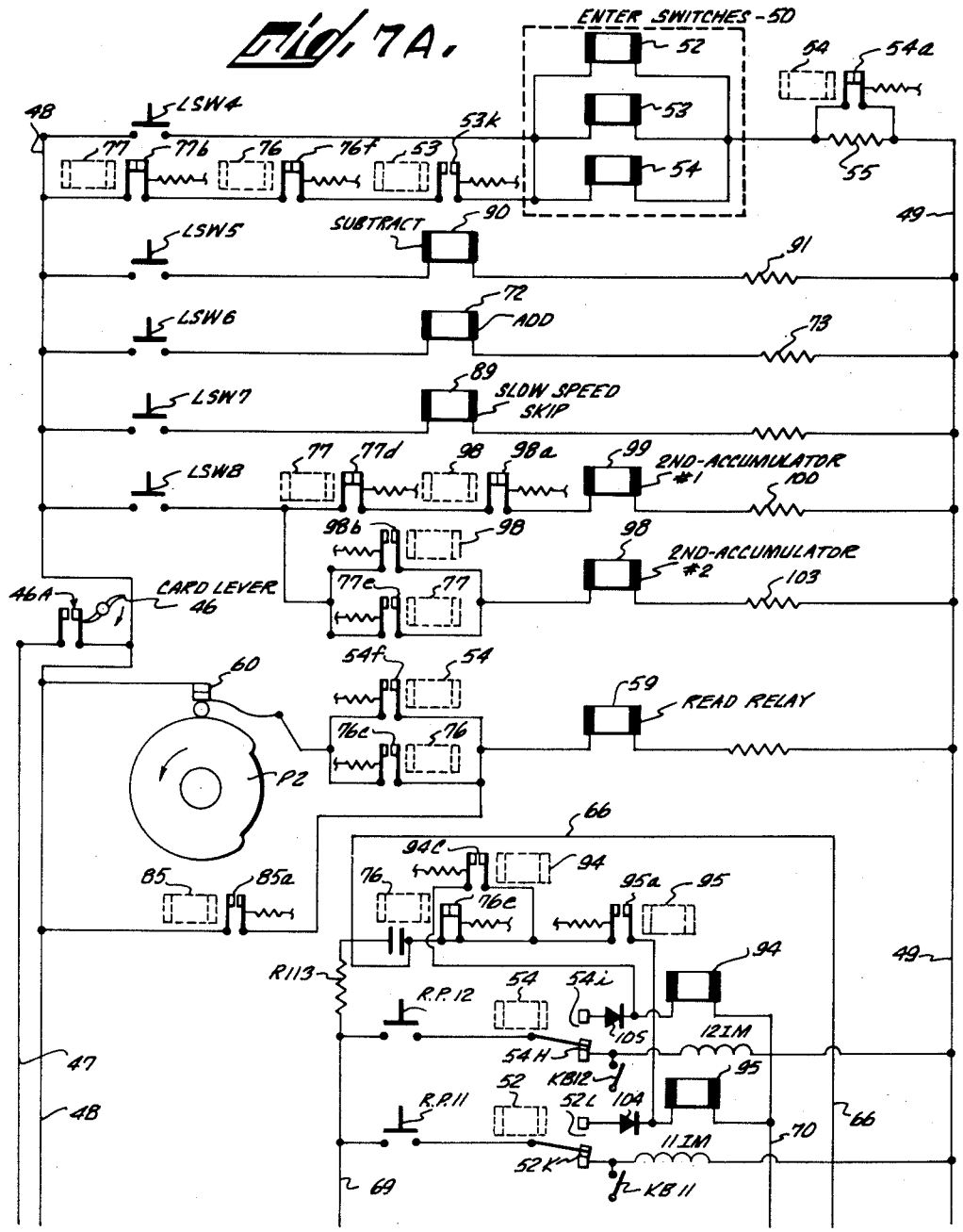

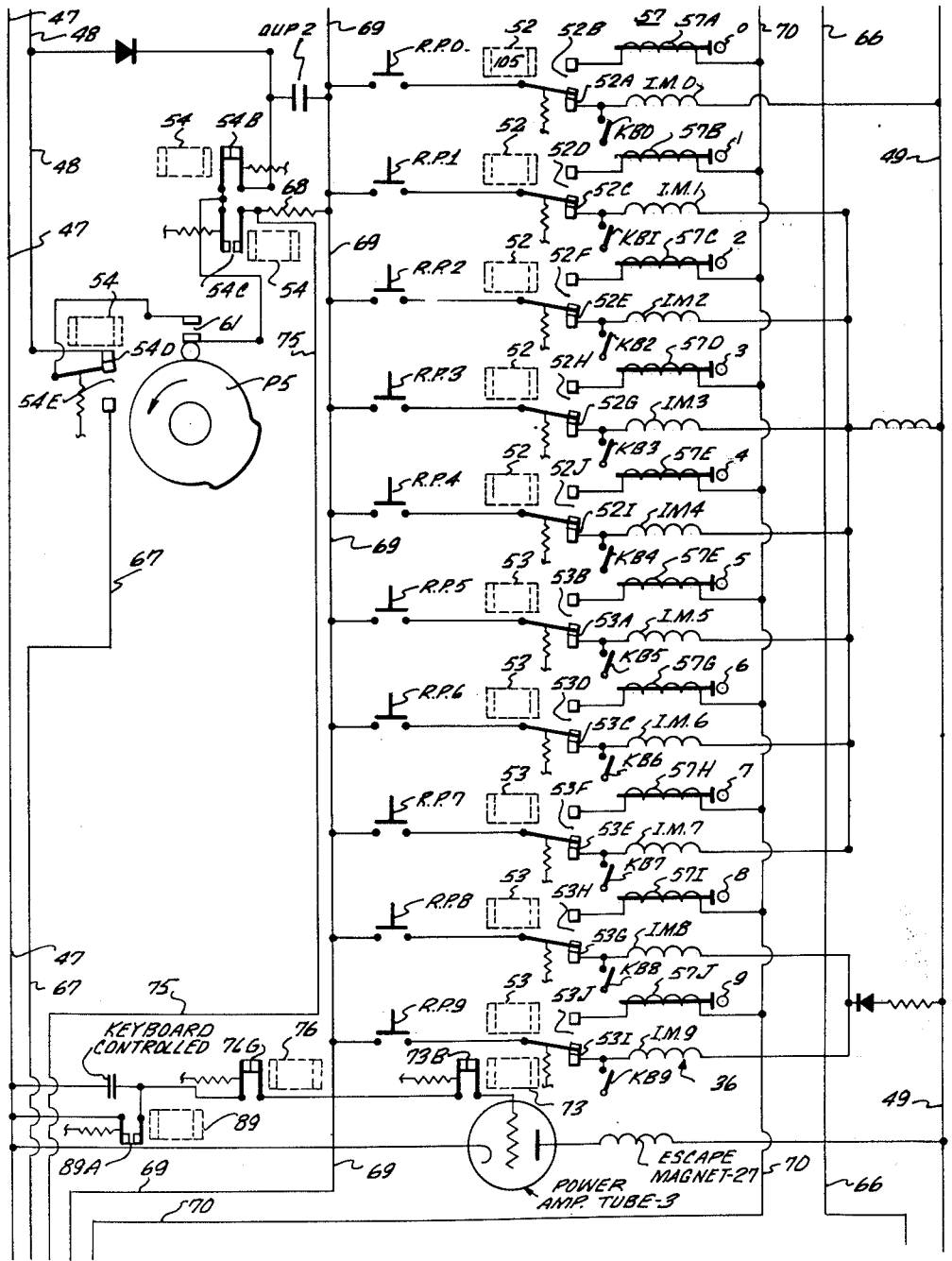

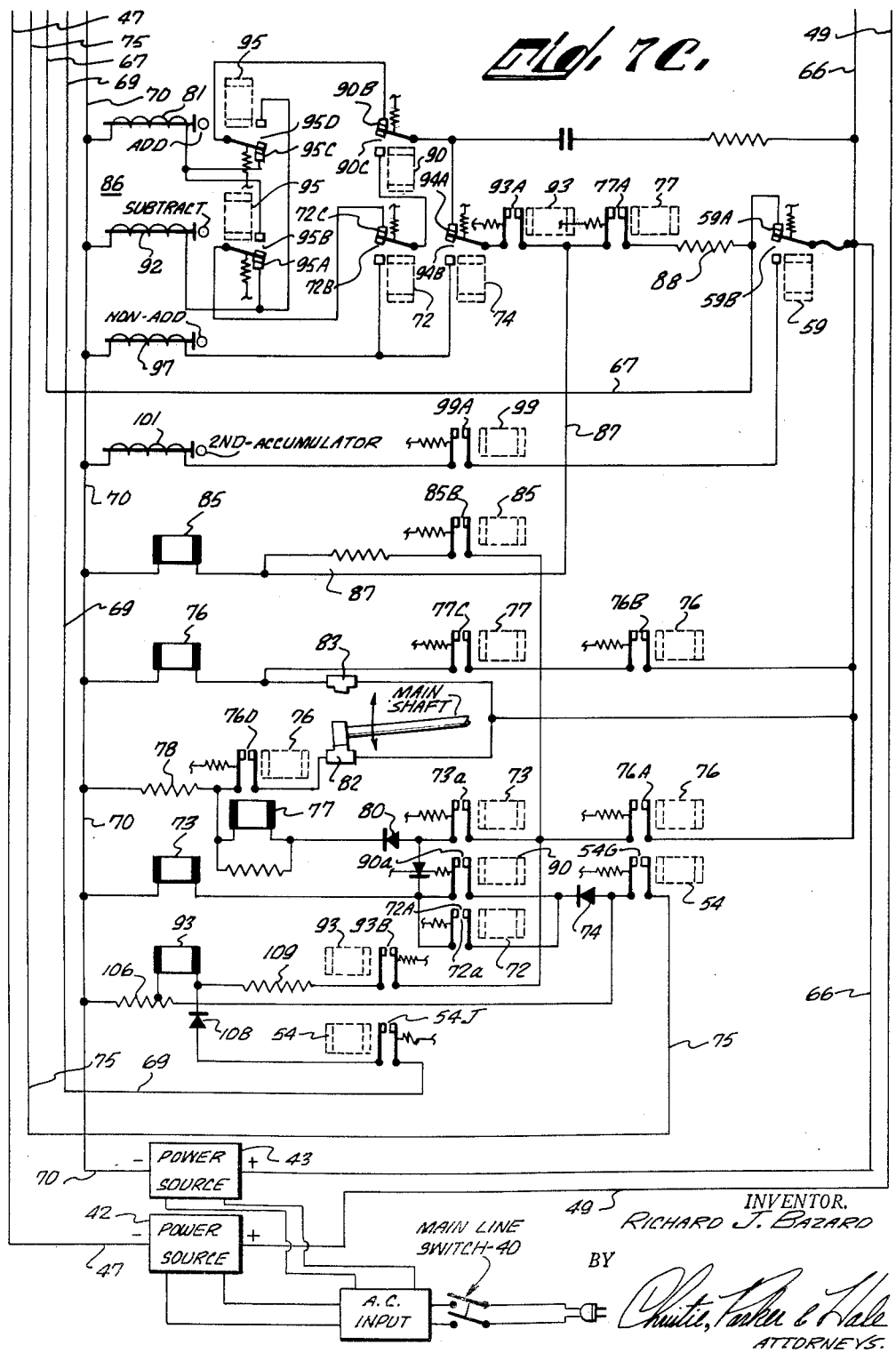

United States Patent Office 3,076,598
Patented Feb. 5, 1963

3,076,598
DATA PROCESSING SYSTEM
Richard J. Bazard, West Covina, Calif., assignor to Datex Corporation, Monrovia, Calif., a corporation of California
Filed Oct. 30, 1958, Ser. No. 770,838
9 Claims. (Cl. 235—61.9)

This invention relates to data processing systems, and more particularly to data proofing apparatus for providing a printed record for checking or tallying purposes from storage media having information marks thereon. The invention is particularly adapted to be utilized with storage media of the perforated record card type, and which cards are sensed to controllably and automatically enter the information represented by the perforations or marks into a printing device, such as a ten key adding machine or the like, to thereby provide the printed tape record.

Record controlled accounting and computing machines have found extensive use in business and scientific applications since they eliminate many of the repetitious clerical operations encountered. These record controlled machines may be under the control of the well known perforated or punched record cards to provide the input and output means for the machine. The punch card has also been employed as a commercial document for special or personal banking accounts to take advantage of the convenience afforded in handling information by such a control member in card processing machines. In addition to the punched card check this type of record card has been employed for other similar commercial transactions, such as in sales and payroll distribution, accounts receivable and payable, and for installment accounts.

Generally, in all these commercial transactions the cards are sorted and grouped together for a particular customer or bank, and the group or batch of cards is provided with a tally sheet which may be in the form of an adding machine tape showing the individual transactions and a total or subtotal for these transactions. The complete batch is delivered to the responsible individual, customer, or bank, in this fashion along with the adding machine tape. Upon receipt of such a batch of punched cards the responsible individual generally desires to check the adding machine tape by his own means prior to processing the punched cards further by making any final entries or further accounting operations based on these records. Such tallying or checking on the part of the customer has been performed by recording the written information onto a record card and then processing same. In this form the records may be handled by conventional accounting machines and procedures to provide a check or "proof" of the adding machine tape received.

It has been found convenient to construct card processing machines to include the aforementioned proofing feature. The addition of this proofing feature into conventional card reading and punching machines, however, has resulted in a machine of a considerably higher cost that the conventional reading and punching machines. Although such a proofing feature is desirable, it has economical limitations. Accordingly, the need for an inexpensive data processing system, including the proofing feature, compatible with present day business methods and accounting procedures and readily adaptable to commercially available card processing machines is clear.

The present invention provides an improved data processing system including proofing capabilities of the character indicated and which system incorporates commercially available business machines and permits the use of all the features of these machines advantageously. The proofing apparatus is utilized in combination with a record card punch of the type having sequential recording and reading stations in combination with a conventional ten-key adding machine. Each of these machines is adapted to provide the proofing feature with only relatively inexpensive modifications to these machines. To this end the operation of the punch card machine may be utilized in normal fashion when the proofing feature is not required, and some operations of the punch card machine may be carried out even with the proofing apparatus in operation. The type of operation required for this improved and novel data processing system furthermore does not necessitate any special training on the part of the machine operator beyond that required for operation of the conventional record card machine.

The improved data processing system including the novel proofing arrangement disclosed results by advantageously combining a conventional ten-key adding machine with a reading-recording card punch having a reading station capable of reading data cards being processed in time relation with the reading of a single program record card. The program record card may be prepared by means of the recording station of this same card punch without resorting to auxiliary punching apparatus. The data record card contains the desired information for entry into the adding machine accumulator to provide the final printed record. The information to be entered from the data record card and the adding machine function or operation to be performed thereon is governed by command or control signals derived from the previously prepared program record card. In this same fashion, then, the field or area of the data card containing the desired information to be processed is defined by command signals from the program record card. To this end the reading station of the card punch is connected to a novel control circuit responsive to the command signals for effecting the direct entry of the data signals into the adding machine.

The adding machine is provided with a bank of solenoids, one solenoid is utilized for each key of the machine, and which bank is positioned over the conventional machine keyboard to automatically operate the keys in response to the data signals provided at the reading station. The data is derived from the data card at the reading station in a serial fashion and entered into the adding machine in the same manner. Along with the completion of each entry of a field or group of information within a selected data field, an adding machine arithmetic operation such as an add, subtract or non-add cycle is initiated to enter the data into the adding machine accumulator and also to subsequently print it out on the machine tape. The information recorded in the adding machine is also under the control of the operator through the provision of accessible manual controls shown in this instance for performing total, subtotal or non-add machine operations.

The invention is explained in detail with reference to the drawings, in which:

FIG. 2 is a schematic representation of the record card processing machine of FIG. 1 including a block-wiring diagram for the card machine and illustrating the printing device of FIG. 1 in perspective, with the solenoid cover removed;

FIG. 3 is a plan view of the keys for the printing device shown in FIGS. 1 and 2;

FIG. 6 is a plan view of a prepared program card and data cards shown in vertical alignment; and FIGS. 7A, 7B and 7C taken together form a wiring diagram for the data processing system.

Figure 1:
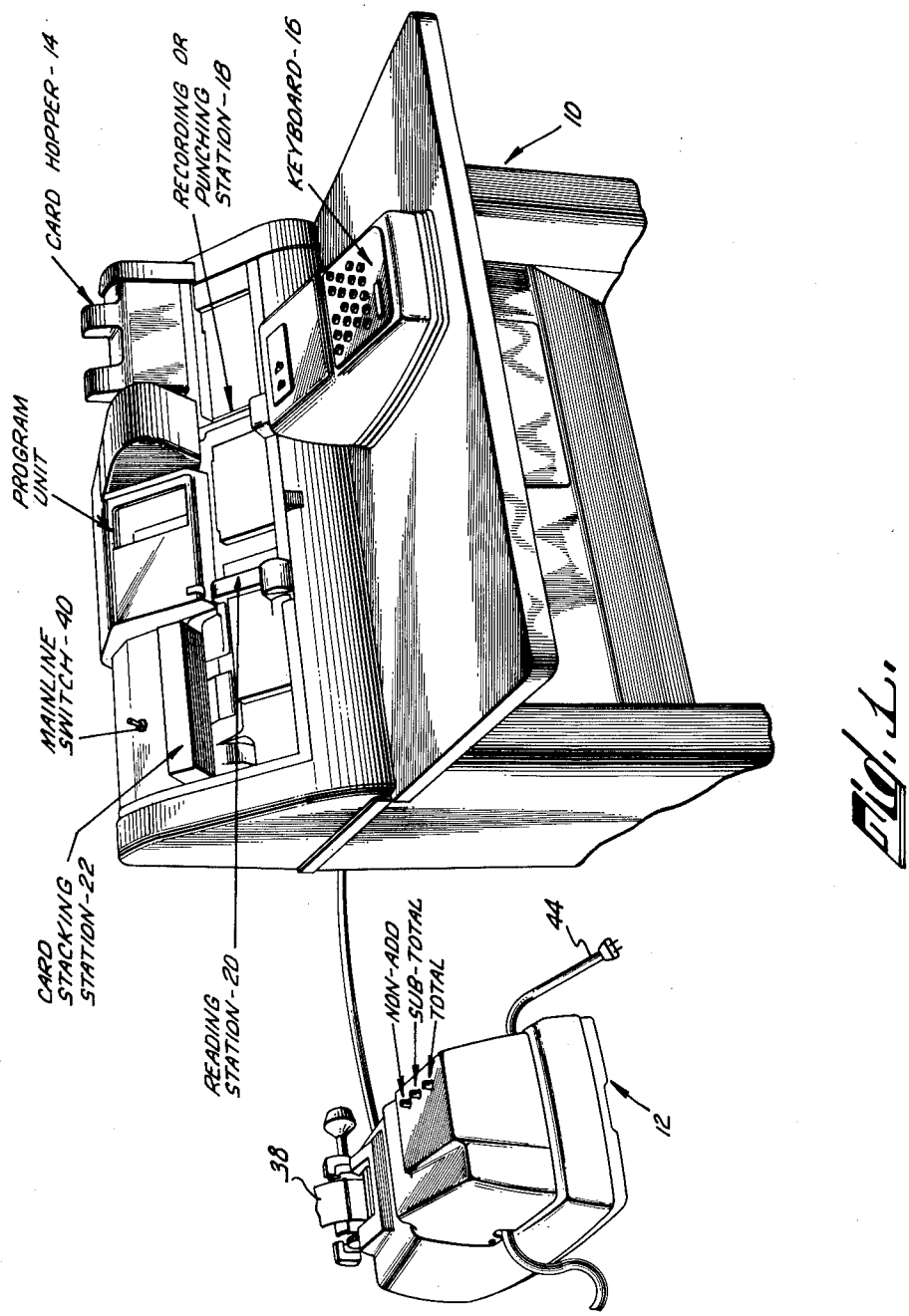
FIG. 1 is a perspective view with portions broken away, of the machines utilized in the data processing system and embodying the invention.

Referring to the drawings, the data processing system is shown in FIGS. 1 and 2 as comprising a record card processing machine 10 and a printing device 12 associated therewith. The record card processing machine 10 shown for purposes of describing the invention is a printing card punch commercially available from International Business Machines Company of New York city, New York, and further identified as "IBM" Type 26. Any similar data processing apparatus including the "IBM" Type 24 card punch may also be adapted and utilized in the novel processing system of this disclosure. The record card processing machine 10 is operative with standard imperforated or punched record cards 13 generally stored in a receptacle or card hopper 14 provided with the machine 10. The record cards 13 utilized for the novel processing system are illustrated in FIG. 6. The record cards 13 shown are dimensioned with 12 recording or punching rows arranged horizontally thereon and 80 vertical columns. The recording rows 0–9 are generally printed on the face of the cards 13 and represent the corresponding decimal digits. The rows 0, 11 and 12 are utilized to define a zone for the record cards; the row 11 is sometimes also referred to as the "X" punch. Numerical information is recorded on the cards 13 by punching a single hole in one of the 80 columns in the row representative of the digit to be recorded. The digits are recorded on the record cards 13 in terms of fields or areas and which fields generally extend over two or more columns with the most significant digit recorded first, that is in the lowest numbered column.

The record cards 13 are stored in the card hopper 14 in an upright position face forward and the "9's" edge down as shown in FIG. 2. The cards 13 are fed from the hopper 14 to a card bed, either automatically or manually by depression of an appropriate key provided on a keyboard 16 and which keyboard also affords manual control over the other functions of the record card machine 10. The cards 13 are advanced to the card bed one at a time and are then sequentially advanced in a columnar fashion, first column first, through a punching station 18, a reading station 20 and finally to a card stacking station 22. At the card stacking station 22 the cards are ejected and vertically stacked "9's" up. The cards 13 are advanced through each of the stations 18, 20 and 22 column by column in a timed relationship.

The record cards 13 bearing the numerical information required for the proofing operation will be referred to throughout the specification and claims as data cards, while the record card providing the command as program information is merely designated as a program card.

The reading station 20 receives the cards from the punching station 18 and is arranged approximately one card length away from the punching station 18. The reading station 20 includes means for reading or sensing a previously prepared program card 23 as well as the data card received from the punching station 18. For this purpose the record card machine 10 is provided with a program unit including a rotatable program drum (not shown) to which the program card 23 is clamped; see FIG. 1. The program drum is arranged within the record card machine 10 to be rotated column by column in a time relationship with the advancement of the record cards 13 through the recording station 18 and reading station 20. Means for reading the program card 23 are diagrammatically shown in FIG. 2 and identified by the reference character 24. The reading means 24 is conventional with the record card machine 10 and generally takes the form of sensing devices known as star wheels (not shown). A star wheel is employed for sensing each recording or punching row position and rides over the face of the program card until a perforation in the card is presented to the star wheel. The star wheels at this time drop into engagement with a contact roller through the perforation to provide an electrical signal or impulse corresponding to this sensed perforation. The star wheels employed with the record card machine 10 may take the form of long star wheels or short star wheels and which designation merely has reference to the length of the arm for the wheels to indicate the card column sensed by the star wheels. The short star wheel is arranged so that it will extend outwardly to sense a first column of a record card 13 while a long star wheel is provided with an elongated arm so as to extend beyond this first record card column and sense the next adjacent or a second column. The short star wheels are used in the normal card duplicating procedure for the conventional machine 10 when it is desired to record at station 18 the information sensed at reading station 20. Only the long star wheels are utilized for the programming of the data processing system disclosed. Accordingly, the record card column being sensed by the program card reading means 24 for the proofing operation is the identical column being read by a data card reading means 25. These identical columns are further identified as column "N" while the column presented to a short star wheel and the column at the punching station 18 is identified as "N–1." The relationship of the card columns at the reading and punching stations 18 and 20, respectively, are more evident from an examination of FIG. 5.

The data card reading means 25 comprises a series of aligned reading pins, one pin for each card row and which pins also function to provide electrical signals or impulses of the type provided by the star wheels resulting from the reading operation. The read pins are identified in the drawings as R.P. with the row sensed, such as R.P. along 1 for the read pin for digit corresponding to row 1 while the star wheels are similarly identified as LSW–1, for the same row.

The punching station 18 is much like the reading station 20 and has 12 punches arranged for each punching row and which punches are under the control of individual interposer magnets, generally identified by the reference character 36. The energization of one of the punch magnets 36 causes its associated punch to be driven through a record card 13 at the desired row and column. The interposer magnets I.M., are further identified by their individual row as I.M.–1.

Since each record card 13 is advanced column by column through recording station 18 and reading station 20 the timing of this card advancement is necessarily under the control of the record card machine 10. To this end the timing of the data processing system is based on what is termed a "punching cycle" for the machine 10. A punching cycle is initiated when it is desired to advance a record card one column and which advancement may be accomplished manually from the keyboard 16 or automatically from commands derived from the program card 23. Each method of initiating the punching cycle results in the energization of an escape magnet 27. The escape magnet 27 controls a latch 28 normally associated with a notched wheel 29 arranged with the driving shaft for intermittently advancing the record cards 13 through the various stations. Each notch on the wheel 29 corresponds to one card column. The manual mode of advancing the record cards 13 only permits the cards to advance one column while the automatic mode, commonly termed "skipping," may maintain the escape magnet 27 energized for a period of time to advance a plurality of card columns through the machine 10 without stopping at each column. The number of columns advanced by this skipping mode is governened by the program card commands. Furthermore the skipping may be at a high speed skipping rate of 80 columns per second or a slow speed skipping rate of 20 columns per second. The slow speed skipping rate still allows the record cards 13 to be read at the reading station 20. The high speed skipping mode or automatic advancement is conventional with the machine 10 while the slow speed skipping is a feature of this invention and the use of these skipping modes in the system of the invention will be made more evident hereinafter.

The record cards 13 are advanced in the indicated columnar fashion when the escape magnet 27 is energized through the driving action of a pair of spaced drive rollers such as the rollers 31 and 32 shown at the right hand edge of a record card 13$^d$ arranged at the punching station 18. The cards 13 are driven by the rollers 31 and 32 to a similar pair of drive rollers 33 and 34 arranged at the opposite end of the punching station 18. Similar sets of drive rollers are provided for the reading station 20 for driving the record cards 13 therethrough. All of the aforementioned drive rollers are driven synchronously so that the relationship of the card columns are maintained for the complete travel of the cards through the stations 18 and 20. This synchronous relationship holds true for the rotation of the program drum, so that it also is driven in time with the advancing data cards 13.

Associated with the conventional machine 10 are a series of punch cams and which cams are subject to the same time relationship or punching cycle as the advancement of the record cards 13. The punch cams rotate through 360° in approximately 50 milliseconds to thereby also define the punching cycle. Two such punch cams identified as cams P2 and P5 are utilized as timing means for the proofing operation of this novel data processing system. The specific function of these timing cams in the circuitry of the invention will become evident in the description to follow.

The printing device 12 may be conveniently placed on the desk top of the record card machine 10 and is shown apart from the machine 10 in FIG. 1 for illustration purposes only. The printing device 12 utilized in the novel data processing system of this invention may be any conventional printing device or key operated adding machine. The printing device 12 in this instance has taken the form of a ten-key adding machine commercially available from the Monroe Calculating Machine Company, Inc., of Orange, New Jersey. The information derived from the reading station 20 is entered into the printing device 12 by directly entering the data signals as they are read, most significant digit first. The 10-key type of adding machine is known to receive serial information and to index one place to the left in response to each new entry. The digits serially entered in this fashion are followed by a machine function such as addition, subtraction or non-add. It has also been found that the versatility of the novel data processing system is improved by employing a printing device 12 of the adding machine type including two accumulators. The Monroe Calculating Machine Company type 600 duplex adding machine has been found satisfactory for this purpose. The information is normally transferred into the first accumulator of the adding machine unless the second accumulator key is depressed. Accordingly, having entered the information into the printing device 12 and having initiated a machine cycle, the information will be transferred from the adding machine keyboard 37 and printed on the adding machine tape 38.

The record card machine 10 and the printing device 12 thus far described are of conventional construction and per se form no part of the present invention.

The data processing system is generally arranged to provide a means for entering the numerical data from designated fields of the data record cards 13 into the printing device 12. The system is adapted to operate from the reading station 20 of the machine 10 for automatic operation of the printing device 12 by actuating the adding machine keys in a serial fashion. The automatic operation of the adding machine keys is affected through the provision of a bank of solenoids 39 arranged over the adding machine keys for operating same in response to the signals from the reading station 20. The keyboard 37 is shown in FIG. 3 with the keys and their relative location and each key being identified in normal adding machine fashion. It will be appreciated that the bank of solenoids 39 are mounted on a platform 39$^a$ to overlie the keyboard 37 in a fixed spaced relationship with a solenoid individual to each adding machine key. Each solenoid is provided with a plunger adapted to extend through the platform 39$^a$ to operatively engage the associated machine key in response to the energization of the solenoid winding. The total, sub-total and non-add keys for the printing device 12 have been arranged to extend from the cover 12A, enclosing the adding machine keyboard 37 to allow manual control of these machine functions. Any of the other keys may be adapted to be manually controlled in the same fashion.

The information sensed from the data cards 13 at the reading station 20 is under control of the commands or the electrical signals derived from the program card 23. The program card 23 controls the field of the data cards 13 to be entered and also the machine function for the selected field. Therefore the operations such as addition, subtraction, non-add and accumulator selection can be automatically performed along with the printing of the desired numerical information on the adding machine tape 38.

It should be noted at this point that the data processing system has been so modified so as not to inhibit any of the normal functions and operation of the record card machine 10 while the proofing arrangement is disconnected therefrom and also not to inhibit any of the manual operations possible with the machine 10 while the proofing arrangement is connected to the machine. To this end the record card at the recording station 18 may be punched by the operator while the card at the reading station 20 is being read.

Prior to further discussing the operation of the novel data processing system the organization of a program card 23 for affecting the proofing operation will be examined. The program card 23 shown in FIG. 6 is a conventional record card having the 12 recording positions and the 80 columns. Row 12 is utilized to define the field or area of the data card to be entered into the printing device 12. This field definition is accomplished by punching a hole in row 12 for each column to be entered. For example, the first field to be entered from the data card 13$^c$ is the field comprising columns 11, 12 and 13 of this data card and accordingly the corresponding columns on the program card 23 bear perforations in row 12 for these columns. For each field defined in this manner an enter command is also required to initiate the proofing operation. The enter command is recorded in row 4 of the program card 23 in the first column of each field to be entered. This enter command is required for each field even though the fields are arranged adjacent to one another. The adding machine functions are programmed by a perforation in the last column of each field to be entered and each machine function is assigned a row or rows for their particular designation. The last column of the field to be entered is also utilized on the program card for controlling entry into the second accumulator.

The punching row 12 in addition to defining the field to be entered is also employed for high speed skipping. The high speed skipping operation is programmed by means of a hole in row 11 or an "X" punch in the first column of the field to be skipped followed by a hole in row 12 for each column to be skipped. Slow speed skipping is also assigned a characteristic row and must be programmed in this row in the last three columns prior to the field to be automatically entered when immediately preceded by high speed skipping. The aforementioned programming will become even more evident by reference to Chart I shown below.

CHART I

| Command or program | Program card row to be punched | Column where punch should appear | Adding machine function |
|---|---|---|---|
| Enter | 4 | First column of each field to be entered. | Starts entering field in the keyboard 37. |
| Add | 6 | Last column of each field to be added. | Adds keyboard 37 value into first accumulator and prints value. |
| Subtract | 5 | Last column of each field to be subtracted. | Subtracts keyboard value from first accumulator and prints value. |
| Non-add | 5 and 6 | Last column of each field to be listed. | Prints value of keyboard 37 without entering into first accumulator. |
| Slow speed skip. | 7 | (1) All columns that are to be read without operator advancing the card from the keyboard. (2) All columns where skipping is desired immediately preceding a field to be automatically read. | Advances card at free run rate (20 columns/sec). |
| Second accumulator. | 8 | Last column of each field which is desired to be entered into second accumulator (must be accompanied by another punch designating "Add" or "Subtract"). | |

At this point it should be noted that the proofing operation is limited to entry of field of 11 columns or less. Also fields of a single column may not be entered into the printing device 12 without modifying the disclosed system. When it is necessary to enter a single digit number, such as 5, the single digit 5 should be defined by a two column field having zero as the most significant digit preceding the digit to be entered, i.e. 05. Also all normal functions of the record card machine 10 such as duplication or gang punching may be programmed in fields where the above noted proofing programming is not used with the sole exception of the high speed skipping.

The electrical connections between the devices of the machine may be studied by referring to the wiring diagram shown by the combination of FIGS. 7A, 7B and 7C. When the main line switch 40 is placed in the on position the power is connected to the record card machine 10. The actuation of the line switch 40 will close the circuits from the alternating current line to the direct current power source 42 for the machine 10 as well as closing the circuit to the direct current power source 43 for the proofing apparatus. The printing device 12 will be powered by connecting the power cable 44 for the device into a 110-volt alternating current receptacle.

It should be note dat this point that the program card 23 may be prepared at the recording station 18 of the machine 10 prior to mounting on the program drum. It is not necessary then to prepare a program card with auxiliary punching apparatus when utilizing this invention.

The stack or deck of record cards 13 that are to be processed are placed in the card hopper 14 along with a blank card at the bottom of the stack. The blank card is employed to allow the last record card to be advanced and processed through the reading station 20. The record card processing operation may then be started by pushing the release key on the keyboard 16 twice to feed two record cards 13 from the card hopper 14 onto the card bed. Upon a card reaching the card bed a card lever 46, shown in FIG. 7A, is actuated in response to the weight of the one record card on the card bed. The actuation of card lever 46 operates to close the associated normally opened contacts 46$^a$ arranged in series with the negative lead wire 48 for the power source 42. These contacts then connect the lead wire 47 running from the negative side of the power source 42 to the negative lead wire 48. The positive side of the power source 42 is connected to the positive lead wire 49. The machine 10 and printing device 12 are now both prepared for processing data record cards 13. The card processing may consist of recording information at station 18 and then reading this recorded information for the proofing operation or may consist of reading cards that have been previously prepared. This latter mode of card processing still requires that the record cards be advanced through the recording station 18.

Assuming that the first two cards fed from the hopper 14, namely the cards identified by the reference character 13$^a$ and 13$^b$ are advanced through the stations 18 and 20 without any proofing operation, (star wheels not engaging program cards 23) these cards will be advanced so that card 13$^a$ is arranged bottommost in the stacker of stacking station 22 while the card 13$^b$ has just arrived at this station. The succeeding cards namely cards 13$^c$ and 13$^d$ have been advanced in the meantime from the hopper 14 so as to be positioned at the reading station 20 and the punching station 18 respectively, as illustrated in FIG. 2.

The circuit diagram for performing the proofing operation may be best described by carrying out a programming operation for the data card 13$^c$, now located at the reading station 20. Reference will be had to the previously prepared program card 23 and the data card 13$^c$, as shown in FIG. 6. With the data card 13$^c$ at the reading station 20 the star wheels for the program drum may be lowered onto the program card 23. The proofing operation is then ready to begin upon advancing the cards 23 and 13$^c$ to the 11th column of each card, the first column of card 23 to have an enter command. It will now be understood that this advancement occurs synchronously for all the cards under consideration and the reading pins 25 and the star wheels for the program drum will now all be sensing the 11th column.

All circuit operations for the proofing arrangement are initiated by the enter command recorded on the program card 23 at row 4 as indicated in Chart I. Since the enter command is recorded in the fourth punching row, long star wheel number 4, LSW–4, will engage this perforation to close a circuit traced from negative lead wire 47 through now closed contacts 46$^a$, to the lead wire 48, to the positive side of the power supply by means of the lead wire 49 through the enter switches generally identified by the reference character 50. The enter switches 50 comprise in this instance three relays 52, 53 and 54 having their windings arranged in a parallel circuit relationship with LSW–4 and a series resistor 55. The resistor 55 is arranged with a pair of normally closed contacts 54$^a$ for the relay 54 arranged in parallel circuit relationship therewith. This dropping resistor 55 decreases the voltage on the enter switches 50 upon deenergization thereof. The enter switches 50 are maintained energized through the provision of a parallel circuit path between lead wire 48 and the enter switches 50 comprising the normally closed contacts 77$^b$ and 76$^f$ arranged in series with the normally open contacts 53$^k$ for the enter relay 53 of the group of switches 50. Upon energization of the enter switches 50 the control circuitry for the proofing operation is prepared to receive data signals derived from sensing the data card 13$^c$. The circuit functions resulting from energizing the enter switches 50 are detailed in Chart II shown below.

CHART II

| Relay | Contacts | Function |
|---|---|---|
| 52 | 52a and 52b | |
| 52 | 52c and 52d | |
| 52 | 52e and 52f | Switches read pins from interposer magnets 36 to printer solenoids 57. |
| 52 | 52g and 52h | |
| 52 | 52i and 52j | |
| 52 | 52k and 52l | |
| 53 | 53a and 53b | |
| 53 | 53c and 53d | |
| 53 | 53e and 53f | |
| 53 | 53g and 53h | |
| 53 | 53i and 53j | |
| 54 | 54i and 54h | |
| 53 | 53k | Holds enter relays 52, 53 and 54 energized until printer function relay 77 is energized. |
| 54 | 54b and 54c | Switches P5 cam from power source 42 to power source 43 to pulse the printer solenoids 57. |
| 54 | 54d and 54e | |
| 54 | 54f | Connects P2 cam to relay 59 to initiate a read pulse. |
| 54 | 54g | Connects printer function circuit to read pulse bus 69. |
| 54 | 54h | Places resistor 55 in series with enter relays 52, 53 and 54 after they have operated. |

From the above chart it is seen that the switches 50 are effective to disconnect the punch interposer magnets 36 from the source 42 and to alternately connect the adding machine solenoids 57 to the power source 43 through the indicated pairs of normally open and closed contacts. The adding machine solenoids 57 are shown in FIG. 7B. These solenoids 57 are individually identified as solenoids 57a—57j and are respectively arranged in series circuit relationship with the read pins (RP) 0–9 and the contact pairs of the enter switches 50. The solenoids 57 are each arranged to operate an adding machine digit key 0–9 as shown, in response to the circuit closure of their associated read pin. In the same fashion the interposer magnets 36, shown in parallel with each of the solenoids 57a—57j, are identified as I.M-0 through I.M-9 so as to actuate a corresponding punch. The enter switches 50 also provide the necessary switching action, by means of contacts 54b and 54e inclusive associated with relay 54, shown in FIG. 7B, to switch the P5 cam switch 61 from the conventional power source 42 to the auxiliary or proofing power source 43 to provide the power to pulse the printer digit solenoids 57. During this interval the P2 cam switch 60 has been also connected to a read relay 59 by means of normally open contacts 54f of relay 54; see FIG. 7C.

Figure 4:
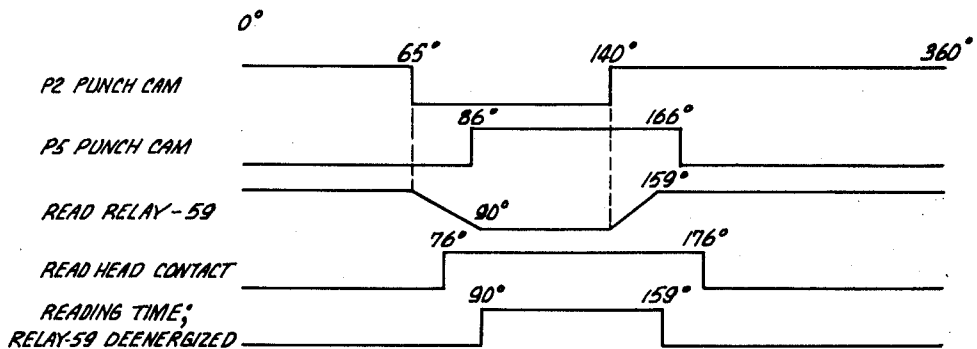
FIGS. 4 and 5 are typical graphical representations of the timing sequences for the data processing system of FIG. 1.

These enter switches 50 energize in the first 12 milliseconds of the "punching cycle" shown in FIG. 4. The punching cycle is represented in terms of the rotation of the timing cams P2 and P5. After the enter switches 50 have been energized, the cycle continues to a point in time of approximately 65 degrees of the cycle at which time the P2 cam has been rotated and has opened the normally closed contacts of the associated switch 60. The opening of the contacts for switch 60 breaks the circuit connection between lead wires 47 and 49 and will cause the winding of read relay 59 to become deenergized. The read relay 59 utilized is a fast acting mercury relay commercially identified as C.P. Clare Mercury relay HG-1001.

As seen in FIG. 4 read relay 59 is being deenergized between the time switch 60 opens at 65 degrees of the cycle until 90 degrees of the punching cycle. The deenergization of relay 59 causes its normally closed contacts 59a to electrically engage at the 90 degree point to therefore apply power to solenoids 57. This circuit connection can be traced from the positive side of the power source 43, through switch 40, to lead wire 66, through now closed contacts 59a to lead wire 67 through now closed contacts 54e for enter relay 54, P5 cam switch 61, closed contacts 54c, resistor 68, through the selected read pin and corresponding solenoid 57 to the lead wire 70 and finally to the negative side of source 43. Before the normally closed contacts 59a (FIG. 7C) of the read relay 59 engage, however, and after the punching cycle continues to around 86 degrees of the cycle, the P5 cam operates to close its associated normally open switching contacts 61. Just prior to the closing of the contacts 61 the read head pin that senses a perforation in data card 13c will close at approximately 76 degrees of the punching cycle.

An examination of the field on data card 13c to determine the numerical information to be entered into the printing device 12 is now necessary. Since the program card 23 has row 12 perforated in each of the columns 11–13, these same columns on data card 13c are to be entered. Reading the perforations in these columns from left to right shows punches in rows 1, 3 and 2, denoting the decimal number 132 to be entered from the data card 13c into the device 12. Since column 11 of data card 13c is perforated in row 1, read pin 1, RP-1, will close the above traced power circuit to the solenoid 57b to operate the adding machine digit key No. 1 from the group of solenoids 57. This reading operation and actuation of the adding machine key is effective after 90 degrees and before 159 degrees of the punching cycle and this interval of the cycle is accordingly defined as the reading time. It will be noted that the reading time corresponds to the time the read relay 59 is deenergized, as seen from an examination of FIG. 4. After the adding machine solenoid 57b is actuated and at about 140 degrees of the punching cycle the P2 cam will again be rotated to a point where it will actuate switch 60 and close the circuit to the winding of read relay 59. The normally closed contacts 59a will at this time break the power circuit connection from source 43 to the adding machine solenoid 57b before the P5 cam is again effective and the RP-1 contacts open. The current from the power source 43 is then routed through the P5 cam switch 61 to protect the read pins in the event the read relay 59 should fail.

This reading circuit will be maintained with each punching cycle as the card is advanced column by column. Accordingly when the data card 13c is advanced from column 11 to column 12 and then to column 13 the digits 3 and 2 are sensed so that the corresponding RP-3 and RP-2 sequentially close and adding machine solenoids 57d and 57c respectively in turn operate adding machine keys 3 and 2 to enter these digits into the printing device 12.

Since the cards 13c and 23 are advanced in a synchronous relationship the star wheels are also sensing column 13 of the program card 23; column 12 being blank. As shown in FIG. 6, row 6 of column 13 for the card 23 is perforated, and which perforation may be determined from Chart I to command an add function for the printing device 12. This add command is sensed by the long star wheel 6 closing the circuit from the lead wire 47, to closed contacts 46a, lead wire 48, through LSW-6 to the add function coding relay 72 and through a resistor 73 to the negative lead wire 49 to thereby energize this circuit from power source 42. The energization of the relay 72 in turn energizes a fast operating relay 73; see FIG. 7C. The relay 73 has its winding between the lead wire 70, connected to the negative side of the power source 43, and to the positive lead wire 66 through the now closed contacts 72a for the relay 72, through a diode 74 and closed enter contacts 54g, by means of lead wire 75 to closed contacts 54c, through contacts 54c and contacts 61, 54e, all closed and by means of lead wire 67 through the closed contacts 59a to the positive lead 66 terminating at source 43. Upon energization of the relay 73 it maintains itself energized through its own contacts 73a and normally closed contacts 76a associated with a printer feedback relay 76 connected to the positive lead wire 66. The energization of the relay 73 is also effective to open the circuit to the escape magnet 27 through its normally closed contacts 73b. This deenergization of the escape magnet 27 prevents the cards 13ᶜ and 23 from advancing as long as the relay 73 is energized.

Figure 5:
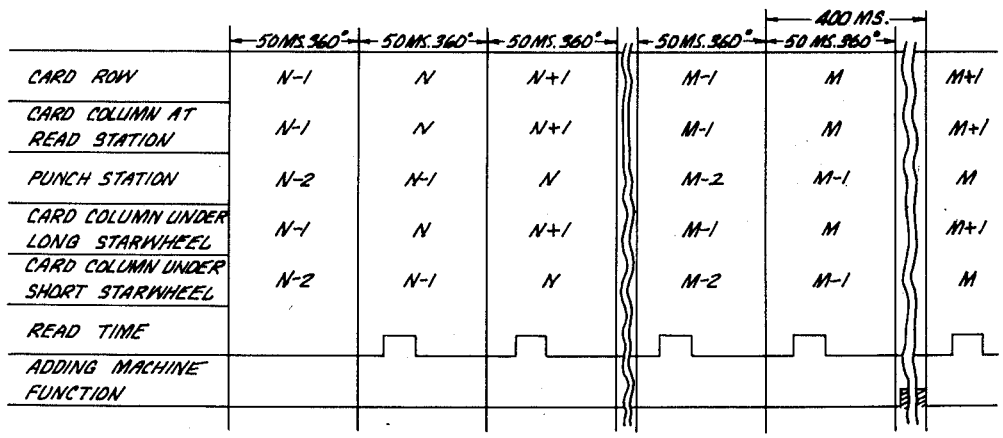

The energization of the relay 73 will after a time delay cause relay 77 to be energized through the closing of contacts 73ᵃ. This circuit can be traced between lead wires 70 and 66, through resistor 78, winding 77, diode 80, and contacts 73a and 76a. The energization of relay 77 takes place after 40 milliseconds so as to allow for completion of the read time of the punching cycle before the associated contacts for the relay 77 are actuated. This time relationship is shown in FIG. 5. Chart III, shown below, shows the functions performed by the contacts of relay 77.

CHART III

| Relay | Contacts | Function |
|---|---|---|
| 77 | 77ᵃ | Apply power to the add solenoid 81 to initiate a printer function cycle. |
| 77 | 77ᵇ | Releases enter relays 52, 53, and 54. |
| 77 | 77ᶜ | Closes holding circuit to relay 76. |

As will be seen from Chart III the relay 77 is effective to deenergize the enter switches 50 and which deenergization is momentary since upon the energization of relay 76, contacts 76ᶜ arranged in parallel with contacts 54ᶠ will maintain the circuit to the read relay 59 closed. The relay 77 will also be seen to apply power to the add solenoid 81 and to thereby initiate a printing or adding machine function cycle.

Before examining the printing cycle further, it is necessary to consider a pair of switches 82 and 83, which may be leaf type switches, incorporated in the machine 12 in association with a "main shaft" for the proofing operation. The "main shaft" is shown in FIG. 7C arranged between a pair of switches 82 and 83 and which shaft is normally found in the Monroe adding machine type 600 and is so designated in the maintenance manual provided by the Monroe Company for this machine. The main shaft is a reciprocating shaft and is responsive to the actuation of any one of the adding machine function keys, such as the add key presently under consideration. The main shaft is arranged so as to maintain the switch 82 in a normally closed position and will reciprocate upwardly, as shown in FIG. 7C, to deenergize the switch 82 and in turn to actuate the switch 83. This reciprocation of the main shaft to actuate switch 83 occurs 150 milliseconds after the start of the printing cycle.

Now continuing the printing cycle, at this time the switch 83 is closed and will provide a direct circuit path through the relay 76 between lead wires 66 and 70. The relay 76 is maintained in this energized condition through the closing of its own contacts 76ᵇ connected in series circuit relationship with the now closed normally open contacts 77ᶜ for relay 77.

A relay 85, a time delay to operate relay is provided to determine the length of the pulse applied to the printer function solenoids 86. The relay 85 is arranged to energize in 40 milliseconds after contacts 77ᵃ for relay 77 close. The circuit for relay 85 may be traced from lead wire 70, through relay winding 85, lead wire 87, contacts 77ᵃ, resistor 88, contacts 59ᵃ to positive lead wire 66. When relay 85 is energized the associated normally open contacts 85ᵃ arranged between lead wire 48 and winding 59 close to energize the read relay 59. The read relay 59 when it energizes, in turn, will remove the power source 43 from the printer function solenoids 86. The relay 85 is maintained energized through its contacts 85ᵇ and the normally closed contacts 76ᵃ, these latter contacts open upon completion of the printing cycle. As the printing cycle continues and approximately 230 milliseconds after the initiation thereof the main shaft will travel back down to deenergize switch 83 and actuate the switch 82 once again. With the closing of switch 82 and the closed contacts 76ᵈ provide a shunt path around the relay coil 77 between lead wires 66 and 70 to thereby deenergize the relay 77. When relay 77 is deenergized all the remaining relays will be deenergized and the control circuit will be conditioned to accept a new field.

The switches 82 and 83 are utilized in the circuit so that the operation of switch 83 will differentiate between the times when the switch 82 opens and closes. Accordingly, the point in time when switch 83 closes is only of interest and not when it returns to its normally open position.

From the above discussion and with FIG. 5 in mind, it is seen that the time required to complete the entry for the last column of a field to be entered is 400 milliseconds. Also, the adding machine function occurs after the first 50 milliseconds or after the punching cycle is complete. However, all the command signals for carrying out the adding machine functions have conditioned the control circuit to respond to the commands and which commands will be carried out while the data cards 13ᶜ continue their advancement. It will now be appreciated that the number 132 has been entered into the printing device 12, added into the first accumulator and printed out on the tape 38. The device 12 is also prepared to receive a new entry from the data card 13ᶜ at this time.

*Subtraction*

Now returning to FIG. 6, it will be seen that row 12 is perforated in columns 14 through 16 and that these same columns are to be entered from the data card 13c into the printing device 12 since column 14 is provided with the required enter command in row 4 of program card 23. Accordingly, the number 610 recorded in the above noted field of the card 13ᶜ also will be entered into the printing device 12 in response to this enter command in the same fashion as described hereinabove for the addition operation for the number 132. After the cards 13ᶜ and 23 have been advanced to column 16, the star wheel associated with row 5 of card 23 will sense the perforation at this point characteristic of a subtract command. Star wheel 5, LSW-5, will close a circuit to the subtract relay winding 90. This circuit can be traced from the lead wire 48 through LSW-5 through relay winding 90 and resistor 91 to lead wire 49 to thereby energize the subtract winding 90. With the energization of the subtract relay 90 the contacts 90ᵃ, which are arranged in a parallel circuit relationship with the contacts 72ᵃ for the add relay 72, are effective to energize the relay 73 through the contacts 54ᵍ associated with the enter relay 54 in the same fashion as described hereinabove for the addition circuit. Upon energization of the relay 73, a printing cycle will be initiated by the energization of the relay 77 and which relay will again perform the same functions that are indicated in Chart III.

In this instance the power to the printer function solenoid 86 will be transferred to the commanded subtract solenoid 92 rather than the add solenoid 81. This transfer of power to energize the solenoid 92 may be seen by tracing the circuit from the lead wire 66 through the closed contacts 59ᵃ through resistor 88, the closed contacts 77ᵃ, through the normally closed contacts 93ᵃ, the normally closed contacts 94ᵃ, through the now closed normally open subtract contacts 90ᶜ through to the normally closed contacts 72ᶜ for the add relay 72 through the normally closed contacts 95ᵃ, and through the subtract solenoid 92 to the lead wire 70. It will also be seen in this circuit that the normally closed contacts 90ᵇ will be open to disconnect the circuit from the add solenoid 81 to maintain it deenergized during the subtraction operation. The energization of the subtract solenoid 92 in this fashion will then be effective to actuate the subtract key of device 12 to subtract the number 610 from the total in the first accumulator and finally print it out on the adding machine tape 38.

Skipping

Referring to program card 23 of FIG. 6 once again, it is noted that column 17 is provided with an X punch in row 11. As indicated hereinabove this X punch will initiate a high speed skipping operation. The X punch is accompanied with a 12 row punch in columns 18–27. The combination of the X punch and the 12 row punches will accordingly command that the data card 13 be advanced at the high skipping rate from column 17 through column 27. Therefore, any data recorded on the card 13c in these columns will not be entered into the printing device 12.

The actuation of a release key normally provided on keyboard 16 will produce high speed skipping. Once the cards have been advanced beyond column 27 it is noted that the program card 23 is provided with a 7 row punch in columns 28 through 30. This 7 row punch commands a change from the high speed skipping rate to a slow speed skipping rate. This change in skipping rates for these columns is necessary since the card 23 is programmed to automatically enter another field beginning with column 31 since this field also is provided with a 7 row punch.

The slow speed skipping rate is sensed by LSW-7 to provide the switching action for energizing relay winding 89 for a slow speed skipping relay. This circuit energization will close the contacts 89a in the power amplifier tube-3 circuit for the escape magnet 27. The contacts 89a are arranged in parallel circuit relationship with the keyboard contacts controlled from keyboard 16. The closed contacts 89a will then close the circuit to the grid for the power amplifier 3 to provide the energization for escape magnet 27 to advance the cards and command a punching cycle at each column. The contacts 89a will maintain the escape magnet 27 energized as long as LSW-7 senses a perforation in row 7 of program card-23.

As indicated immediately above, the cards will be advanced when the key on keyboard 16 closes the grid circuit for power amplifier tube-3. This escape magnet circuit is provided with series normally closed contacts 73b and 76c which open when the device 12 is going through a printing cycle.

Non-Add

The program card 23 is arranged with an enter command to enter the data in columns 31 through 34 which are now advancing at the slow speed skipping rate. The enter operation for this field will be the same as that described for the addition and subtraction operation. After the cards 13c and 23 have been advanced at the slow skipping rate to the last column of this field, the star wheels 5 and 6 will sense the perforation in rows 5 and 6 and which perforations are characteristic of the subtraction and addition perforation described hereinabove. Accordingly these star wheels will energize the subtract relay winding 90 and the add winding 72, respectively. Once again the relay 73 will be energized as previously described above and the time delay relay 77 upon energization will initiate the printer cycle, however, for this commanded non-add operation the power will be transferred from the add solenoid 81 and the subtract solenoid 92 to the non-add solenoid 97. This circuit may be traced from the closed contacts 59a through to the normally closed contacts 94a, as described for the subtraction operation, and then through the closed normally open subtract contacts 90c, through the closed normally open add contacts 72b, through the non-add solenoid winding 97 to the lead wire 70. The energization of the subtract solenoid 90 will be seen to disconnect the power from the add solenoid 81 by means of normally closed contacts 90b, and in the same fashion the energization of the add solenoid 72 removes the power from the subtract solenoid 92 by means of the normally closed contacts 72c.

The energization of the non-add solenoid 97 will then actuate the non-add key which will omit the step of entering the data from card 13c into either of the machine's accumulators but will merely print this data, namely the number 5678, onto the adding machine tape 38.

Second Accumulator

The next field commanded by the program card to be entered into the printing device 12 comprises the columns 35 through 37. The enter command in row 4 column 35 is provided along with an add command in row 6, column 37. It will also be noted that a second accumulator command is recorded on card 23 in row 8, column 37.

The enter operation for this type of programming will be the same as previously discussed, the only difference lies in the actuation of the second accumulator key. The row 3 punch for the second accumulator operation will be sensed by star wheel 8 so as to close a circuit from lead wire 48 through LSW-8 to the normally closed contacts 77d to the normally closed contacts 98a for a protective relay 98, through the second accumulator relay winding 99 and by means of a resistor 100 to lead wire 49. Therefore, under the above circuit conditions the read relay 59 becomes energized, at a time other than the read time, to close the normally open contacts 59b, a circuit will be closed from the lead wire 66 through these contacts and contacts 99a to the winding for the second accumulator solenoid 101. The energization of the second accumulator winding 101 will depress the associated second accumulator key so as to enter the information in this field, namely the number 345, into the second accumulator.

A protective feature for the second accumulator solenoid 101 is incorporated in the above circuitry to prevent the destruction of the solenoid coil 101 by maintaining it energized for too long a period. This protective circuit is also energized through LSW-8 and which protective circuit is connected from LSW-8 through two parallel circuit paths provided by the normally open contacts 77e and the normally open contacts 98b for the protective relay 98 having its winding 98 connected in series with this parallel arrangement and a resistor 103 connecting it to the lead wire 49. This protective circuit will not be energized until after the time delay relay 77 is energized, at which time the contacts 77e engage to close the circuit to the coil 98. The coil 98 will lock itself in through its contacts 98b. At the same time that contacts 77e close the contacts 77d in series with the second accumulator winding, 99 will open to deenergize this winding and accordingly the associated contacts 99a will open and break the circuit connection to the second accumulator solenoid 101. Despite the deenergizing of the second accumulator solenoid 101, it will be understood that the second accumulator key will remain depressed since it is latched into engagement as is conventional in present day adding machines.

Data Card Programming Inversion

Referring once again to columns 35 through 37 of the data card it will be noted that an X punch occurs in column 36. This X punch is arranged so as to invert or reverse the adding machine function called for by the program card 23. In this instance the card 23 calls for an add operation and so the X punch will command a subtract operation. It should be noted that the inversion operation will be effective if an X punch occurs in any column of the field to be entered. This inversion operation is sensed by RP-11. The sensing of the inversion X punch will close the circuit from the read pulse bus 69 through the enter contacts 52¹, through the diode 104 to energize the inversion relay winding 95 connected to the lead wire 70. The relay 95 will maintain itself energized through its normally open contacts 95a connected between winding 95 and in series circuit relationship with the normally closed contacts 76e and which latter contacts are connected to lead wire 66.

When relay 95 is energized it will be effective to reverse the current path to either the add or subtract solenoid 81 or 92 respectively. This current reversal for the add command can be seen from a consideration of the contacts 95ᵃ—95ᵈ. The current path will be from lead wire 66 through the closed contacts 90ᵇ in the basic fashion to the now closed contacts 95ᵈ, through to the subtract solenoid 92 to the lead wire 70. The contacts 95ᶜ cooperating with 95ᵈ maintain the add solenoid 81 deenergized. This inversion operation command on the data card 13ᶜ will then override the add command to cause the number 345 to be substracted from the second accumulator total and be printed out on the adding machine tape 38.

The inversion operation commanded by the data card 13ᶜ when the program card 23 commands a subtract operation will also be controlled by the contacts 95ᵃ—95ᵈ for the inversion relay 95. When the cards 13ᶜ and 23 are so programmed the contacts 90ᵇ will be open but the contacts 90ᶜ will be closed, to connect the circuit through to the normally closed add contacts 72ᶜ, to the closed inversion contacts 95ᵇ to pass the current through the add solenoid 81 to the lead wire 70. The normally closed contacts 95ᵃ are open to maintain subtract solenoid 92 deenergized at this time.

*Data Card Programmed Non-Add*

After the cards 13ᶜ and 23 have been advanced manually by the operator from column 37 to column 50 another field will be entered into the printing device 12. This next field will be seen to have the usual enter command and a subtract command. The enter and subtraction operations will be the same for this field as described hereinabove. The field on the data card 13ᶜ for column 50, however, is provided with a 12 punch therein. This data card 12 punch is used to command a non-add machine operation. The non-add command on the data card will override either the subtraction or addition command programmed on the card 23.

This non-add command will be sensed by the RP–12. RP–12 will close the circuit from the read pulse bus 69 through the closed enter contacts 54ⁱ, through a series diode 105 and through the winding for the non-add relay 94 to the lead wire 70. The relay winding 94 will lock itself in through its normally open contacts 94ᶜ arranged in series circuit relationship with the normally closed contacts 76ᵉ.

Upon energization of relay 94 its normally closed contacts 94ᵃ open and disconnect the current from both the add solenoid 81 and the subtract solenoid 92. At this time the contacts 94ᵇ are closed to provide a current path through the non-add solenoid 97 to thereby actuate the non-add key for the device 12. It will now be appreciated that since the contacts 94ᵃ for the non-add relay 94 are in series with both circuits to the add solenoids 81 and the subtract solenoid 92 that when either one of these commands are programmed on the card 23 such a command will be ineffective. The relay 94 will be deenergized when the normally closed contacts 76ᵉ open as is the case for the X punch inversion command. Accordingly the numerical information sensed from this field will be subtracted from the first accumulator of the device 12 rather than added as commanded.

*Blank Column Detection*

The blank column detection means is for detecting blank columns in a field that is programmed to be read. This detection feature will be operative when blank columns are sensed for addition, substraction, non-add or second accumulator machine operations.

The blank column detection circuit arrangement utilizes a sensitive relay 93, see FIG. 7, arranged in a bridge circuit. One leg of the bridge circuit includes the series resistor 68 connected to the read pulse bus 69. Another leg of the bridge circuit includes the read pins also connected to the read pulse bus 69 and their associated printer digit solenoids 57. The other two legs of the bridge circuit are formed by a tapped resistor 106. One terminal of the resistor 106 is connected to the lead wire 70, while the opposite terminal is connected to the common junction between the diode 74 and the enter contacts 54ᵍ. The relay winding 93 is then connected between the tap of the resistor 106 and the diode 108 in series with the normally open contacts 54ʲ and which contacts are also connected to the read pulse bus 69. From this circuit arrangement it will be seen that it is necessary that a read pin sense a perforation in order to complete the associated bridge circuit leg. Accordingly when a read pin contact closure is made the arm of the bridge including the printer solenoid 57 is so proportioned as to maintain the bridge fairly close to balance so as to keep the detection winding 93 deenergized. However, if no punch occurs in one or more columns of the card being read the bridge circuit will be unbalanced so as to cause the energization of relay winding 93.

Since the field under consideration on data card 13ᶜ is blank in column 51, the above described bridge will become unbalanced and the winding 93 will be energized at this time. When the relay winding 93 becomes energized it will maintain itself in this condition through the closing of its own contacts 93ᵇ connected in series with the winding 93 and a resistor 109, the remaining circuit connection running from the contacts 93ᵇ through the normally closed contacts 76ᵃ. The energization of relay 93 will also operate to disengage the normally closed contacts 93ᵃ arranged in the power circuit for the printer function solenoids 86. With the disengagement of the contacts 93ᵃ, power is removed from the add solenoid 81, the subtract solenoid 92 and the non-add solenoid 97. As indicated above since the escape magnet circuit for the machine 10 is disconnected when a printer function is desired, the machine 10 will also lock up or be inoperative as a result of this blank column detection. This detection circuit arrangement will therefore lock up both the machine 10 and the printing device 12 when either the add relay 72 or the subtract relay 90 are energized. It will now be apparent that these two conditions also include the non-add cycle since it is made up of the combination of the add and subtract commands. Also the second accumulator operation requires an add or subtract command in combination therewith in order to be operative and, therefore, the detection circuit covers this arrangement also.

To unlock the machines 10 and 12 to permit the continuation of the card processing, the non-add key of printing device 12 should be manually depressed. This operation of the non-add key causes a non-add cycle of the printing device 12. The energization of the non-add cycle will, in turn, cause the feedback switch 83 to be actuated for energizing the relay 76 and which energization will cause the normally closed contacts 76ᵃ to open and thereby open the circuit to the relay winding 93. This will then release the blank column detection relay 93 along with the enter-switches 50 and the appropriate circuitry in the machine 10 to thereby reset all of these circuits in machines 10 and 12 in preparation for the continuation of the card processing.

Before continuing the card processing, it will also be necessary to remove the card having the blank column thereon and to substitute another card correctly punched without any blank columns. For example, for the two column field under consideration herein, it is desired to enter the single digit 5, the first column of the field should be punched with a zero and the second column with the digit 5. After a card has been prepared in this fashion the processing of the cards may continue in the usual fashion.

After the entry of a plurality of the above fields the operator may desire to have a sub-total printed out on the tape 38. This is readily accomplished by depression of the sub-total key extension protruding from the cover 12ᵃ. Also, at the completion of the card processing, the blank card will have been advanced through the recording station 18 and the last card will have been passed through the reading station 20. At this time the operator will depress the total key extension provided to print out the total of the entries for checking or proofing against the original tape received. These key extensions may be provided for any of the keys of keyboard 37 and which extensions may be readily identified through color coding.

It will now be appreciated that a novel and improved data processing system including proofing capabilities has been provided. The proofing arrangement is operative in conjunction with the reading station of a conventional record card machine from which both the control or command signals and the data signals are derived for the proofing operation. The data signals derived in this fashion are entered into a ten-key adding machine in response to the command signals. The adding machine is provided with subtract, non-add, second accumulator keys which are also controlled by the command signals. It will also now be seen that the command signals from the program card may be overridden by programming commands on the data card. Other desirable features such as automatic card advancement or skipping and blank column detection are incorporated into the novel system thereby increasing its versatility.

Although the invention has been described in conjunction with conventional record card machines and adding machines it will be appreciated that any other machines having the same characteristics may be utilized. Specifically, serial printing devices may be employed in lieu of the various forms of adding machines. Also any record processing machine capable of sensing records to provide the desired command and data signals may be used. To this end magnetically recorded data or perforated paper tape may be utilized as the record member. Accordingly, the appropriate machine may depend on the selected form of record member. Other modifications and changes will be apparent to those skilled in the art.

What is claimed is:

1. A proofing system for data processing apparatus including a power source and sequentially arranged recording and reading stations wherein the reading station includes means for reading correlated portions of a programming record and a data record in a time relationship and providing electrical signals representative of the sensed information, a key actuated printing-adding machine, electromagnetic means associated with said adding machine for actuating the keys of said adding machine, a circuit responsive to command signals from the programming record for controlling the delivery of the electrical information signals from the data record to actuate the adding machine for providing a printing record of the information entered into the adding machine, said circuit including a second source of power adapted to be connected to said reading station and first switching means energizable from the first mentioned power source and responsive to a preselected enter command signal from the programming record for disconnecting said power source from the recording station and connecting said second power source to said reading station in a series circuit relationship with said electromagnetic means, means for advancing a record through said recording and reading stations sequentially and for advancing a programming record through said reading station in a time relationship with the advancement of a record through the reading station, camming means operative in a cyclical fashion with said advancing means, cam responsive switching means arranged in said switching circuit for interconnecting said second power source and said reading station, second switching means for controlling the reading time of said reading station and connected to said electromagnetic means, said second switching means being under the control of said cam responsive switching means whereby the reading time occurs in a time relationship with the actuation of said cam switches and thereby the energization of said electromagnetic means, second electromagnetic means associated with said adding machine for actuating a function key for said machine, third switching means responsive to command signals derived from the programming record for initiating an adding machine function cycle, and fourth switching means responsive to said third switching means and operative a preselected interval after the reading time to accumulate the data entered into said adding machine during a reading interval.

2. A proofing system for data processing apparatus as defined in claim 1 including manual means associated with said adding machine for manually actuating the total, sub-total or non-add keys of the machine.

3. A proofing system for data processing apparatus as defined in claim 1 wherein said control circuit includes means responsive to command signals derived from said data records to override the program signals.

4. In data processing apparatus having a first source of power, a plurality of recording devices connected to said source for recording information marks on record members advanced through said recording devices, a key operated printing device, means associated with each of the keys of said device for actuating same and connected in parallel circuit relationship with said recording devices and normally disconnected from said source, a plurality of sensing devices spaced from said recording devices to read the information marks of the record members advanced through same for providing an electrical connection from said source to one of said recording devices and the related one of said means corresponding to the position of the sensed marks on the record member, means for sequentially advancing record members through said recording and sensing devices, an electrical control circuit including a second power source connected in circuit relation with said sensing devices and said means associated with the printing device for controlling the printing of the sensed information, another plurality of sensing devices spaced from said first mentioned plurality of sensing devices to read program marks from a record member for providing electrical command signals corresponding to the program marks, means for cyclically advancing a programming record member through said latter mentioned sensing devices in a timed relationship with the advancement of said record members through said recording and first mentioned sensing devices, switching means responsive to the command signals and connected to be energizable through said first power source and said another plurality of sensing devices for disconnecting and connecting said recording devices from said first source and to alternately connect and disconnect said first mentioned means to said second source of power in response to a command signal, timing means arranged in circuit relationship with said switching means and said power sources for controlling the application of power to said recording devices and said first mentioned means to allow the actuation of same through said first plurality of sensing devices, and detection means comprising a normally balanced bridge circuit connectable to said second source of power and including said first mentioned plurality of sensing devices in one leg of said bridge circuit for detecting a blank area on said record members, said detection means including switching means connected in parallel with the legs of said bridge circuit to respond to an unbalanced bridge condition when said sensing devices are inoperative for disabling said apparatus.

5. A proofing system as defined in claim 1 wherein said means for actuating the function keys of said adding machine includes means for actuating the add key of said adding machine, means for actuating said subtract key of said adding machine, means for actuating said non-add key of said adding machine and said third switching means includes individual circuit means responsive to the signals derived from said program card to actuate one of the corresponding keys.

6. A proofing system as defined in claim 5 wherein said individual circuit means for actuating said non-add machine key is responsive to the combination of add and subtract signals for a single column to actuate said non-add key.

7. In data processing apparatus as defined in claim 1 wherein said circuit means includes means for detecting the absence of data from a selected area of the data record when predetermined adding machine functions are selected and rendering the data processing apparatus inoperative.

8. In data processing apparatus as defined in claim 7 wherein said adding machine further includes a manually accessible operating key for rendering the data processing apparatus operative after the detection of the absence of data from a data record.

9. A proofing system for data processing apparatus as defined in claim 1 wherein said printing-adding machine comprises a first and second accumulator and keys for selecting each accumulator and said circuit means is normally arranged to enter information into said first accumulator, said circuit means including means responsive to a preselected control signal to enter the data signals into second accumulator.

References Cited in the file of this patent

UNITED STATES PATENTS

| | | |
|---|---|---|
| 1,753,991 | Langford | Apr. 8, 1930 |
| 1,909,548 | Peirce | May 16, 1933 |
| 2,247,906 | Carroll et al. | July 1, 1941 |
| 2,637,399 | Doty | May 5, 1953 |
| 2,647,581 | Gardinor et al. | Aug. 4, 1953 |